United States Patent
Maddox et al.

[11] Patent Number: 6,005,703
[45] Date of Patent: Dec. 21, 1999

[54] OPTICAL SYSTEM FOR LIGHT BEAM SCANNING

[75] Inventors: Randall Adrian Maddox; Wilson Morgan Routt, Jr., both of Lexington, Ky.

[73] Assignee: Lexmark International, Inc., Lexington, Ky.

[21] Appl. No.: 09/095,147

[22] Filed: Jun. 10, 1998

Related U.S. Application Data

[63] Continuation-in-part of application No. 09/086,526, May 29, 1998, abandoned.

[51] Int. Cl.[6] .................................................. G02B 26/08
[52] U.S. Cl. ........................ 359/206; 359/205; 359/207; 359/216; 359/217; 359/662
[58] Field of Search ..................................... 359/205, 207, 359/216–219, 662, 710, 711, 717

[56] References Cited

U.S. PATENT DOCUMENTS

| | | |
|---|---|---|
| 4,297,713 | 10/1981 | Ichikawa et al. . |
| 4,613,877 | 9/1986 | Spencer et al. . |
| 4,982,206 | 1/1991 | Kessler et al. . |
| 5,151,811 | 9/1992 | Makino . |
| 5,191,463 | 3/1993 | Minoura . |
| 5,245,481 | 9/1993 | Kaneko et al. . |
| 5,267,075 | 11/1993 | Yamaguchi et al. . |
| 5,748,355 | 5/1998 | Shiraishi et al. ........................ 359/206 |
| 5,781,325 | 7/1998 | Sekikawa ................................ 359/216 |

*Primary Examiner*—James Phan
*Attorney, Agent, or Firm*—John A. Brady

[57] ABSTRACT

An optical system for light scanning devices in which a beam of light travels from an origin to an object along a light path and has along that path a scan direction and a cross-scan direction. The optical system includes a light source at the origin of the light path, a polygonal reflector located along the light path and having adjacent peripheral mirror surfaces rotatable in the scan direction, and a pre-scan optical sub-system located along the light path between the light source and the polygonal reflector. The pre-scan optical sub-system includes, in order of light travel from the light source, a collimating lens and a pre-scan lens having a convex cylindrical lens entrance surface aligned in the scan direction for converging the light beam in the cross-scan direction, and a convex lens exit surface for converging the light beam in the scan direction. An aperture stop may be provided between the collimating lens and the pre-scan lens to further truncate or reduce the diameter of the collimated beam. The optical system has a post-scan optical sub-system located along the light path between the rotatable polygonal reflector and the object and including a first f-theta lens and a second f-theta lens.

9 Claims, 10 Drawing Sheets

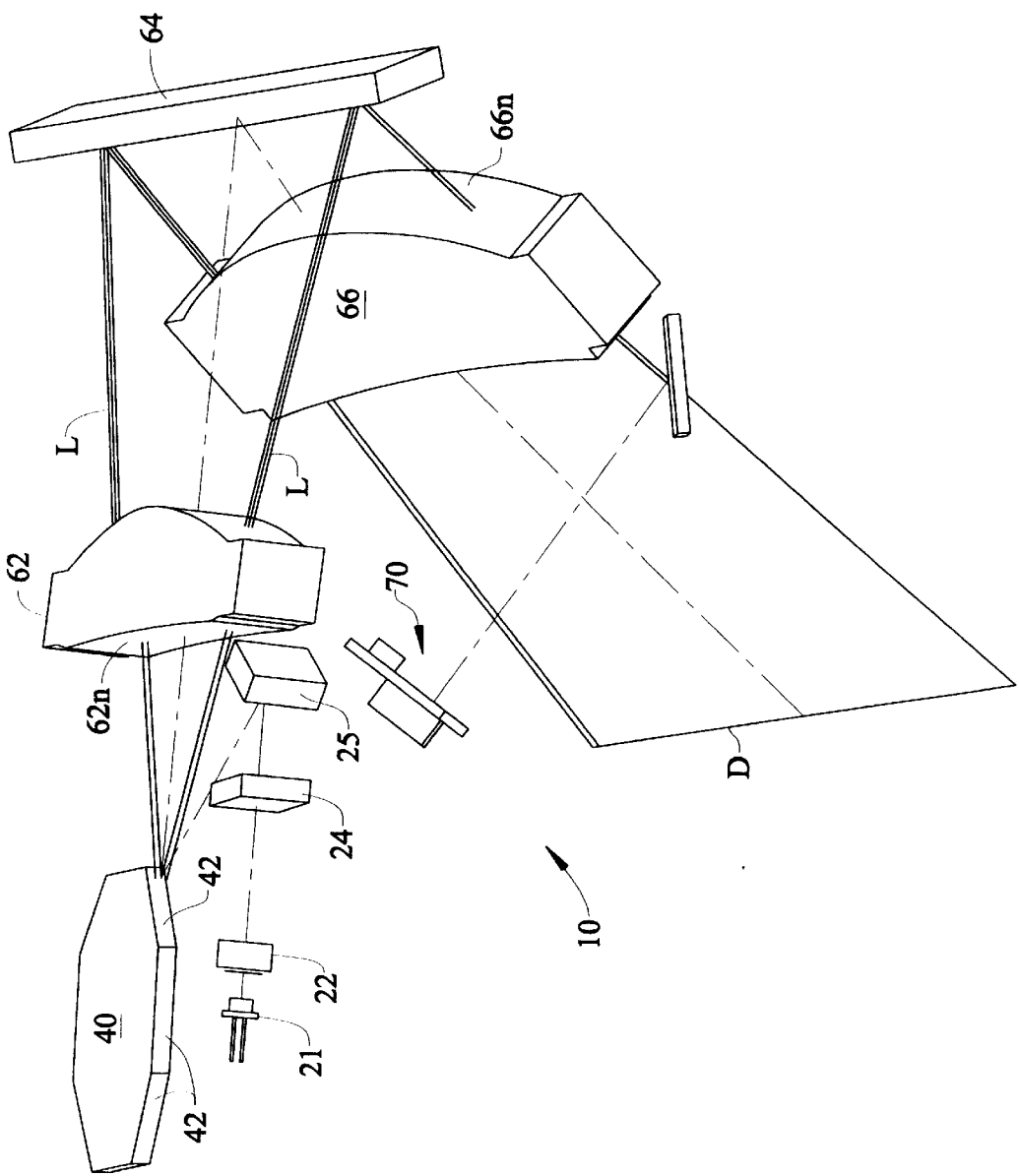

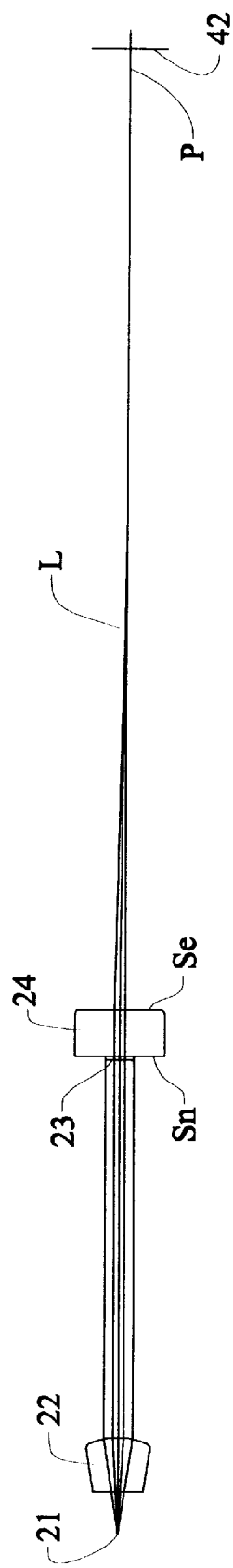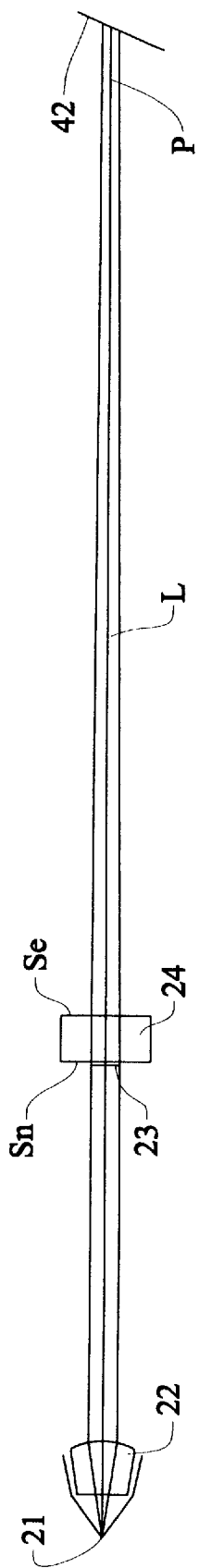

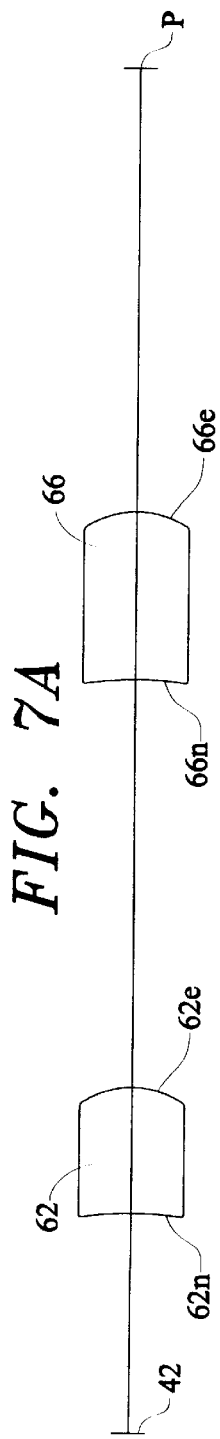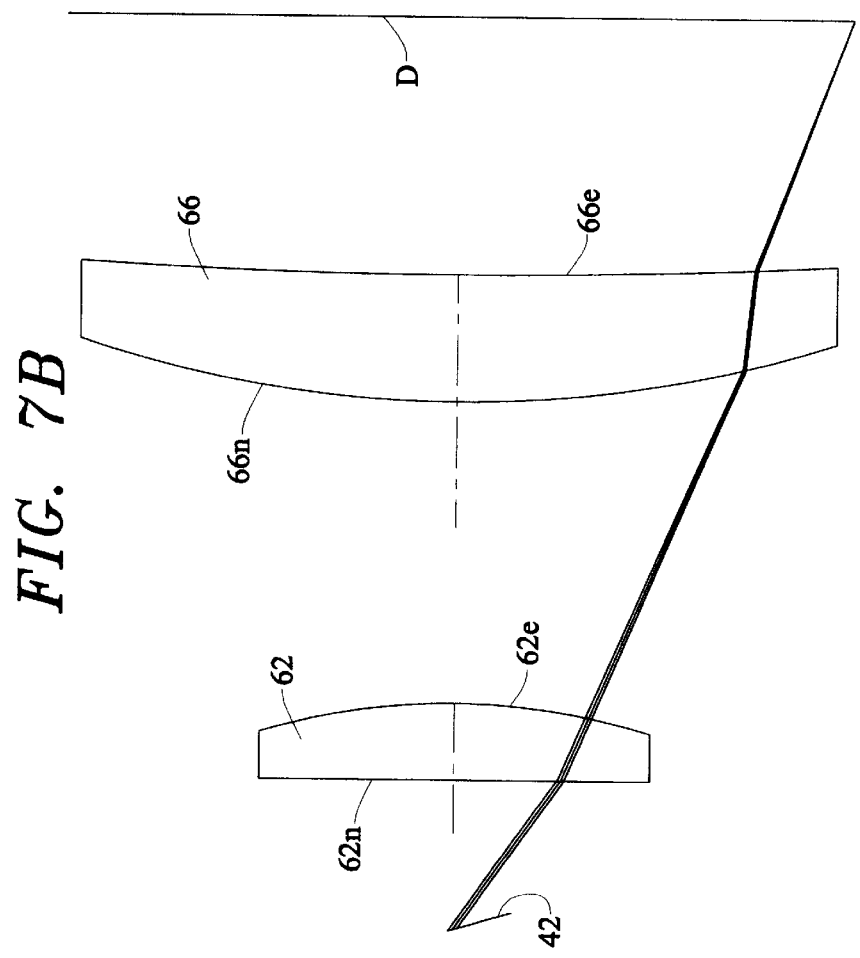

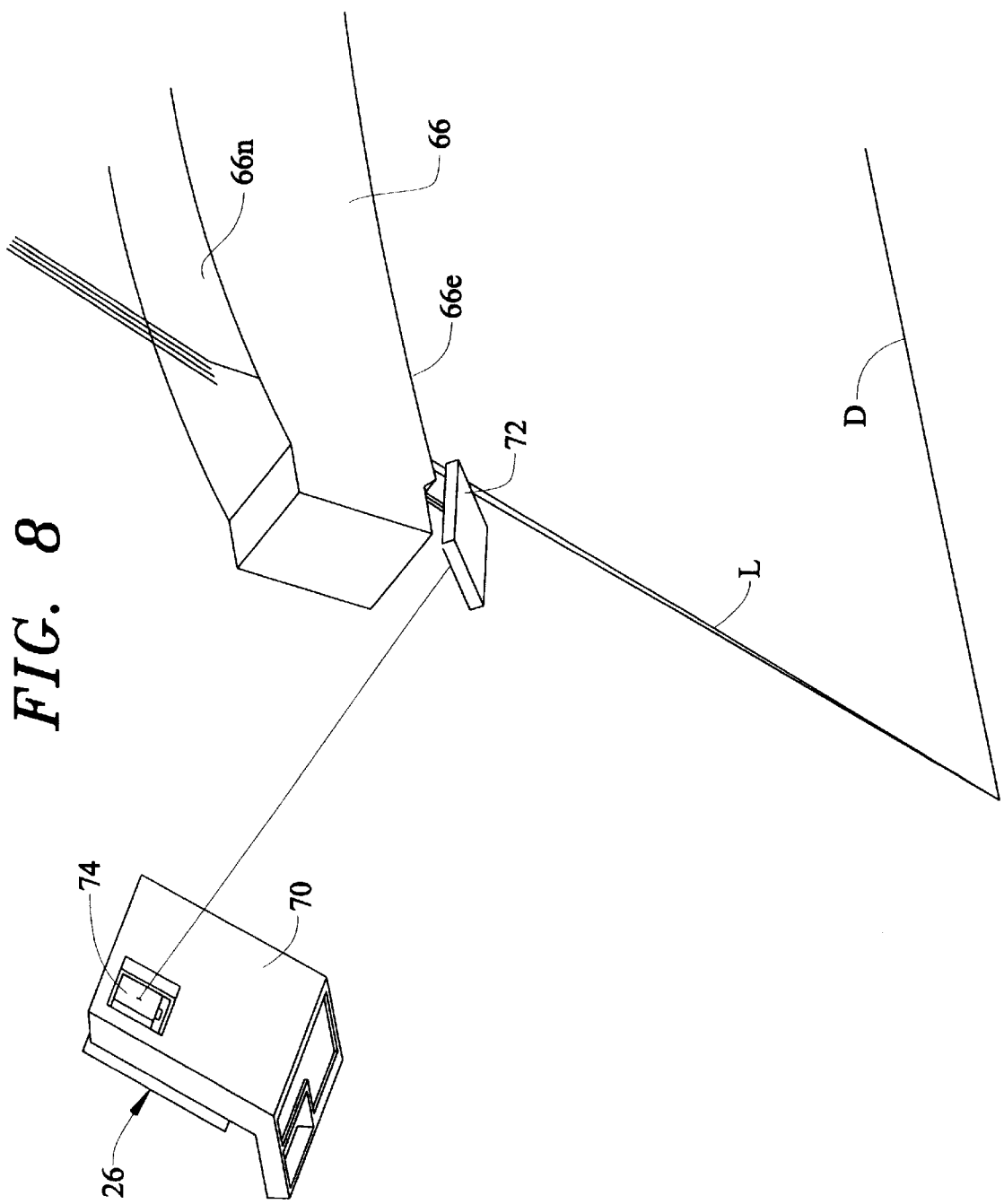

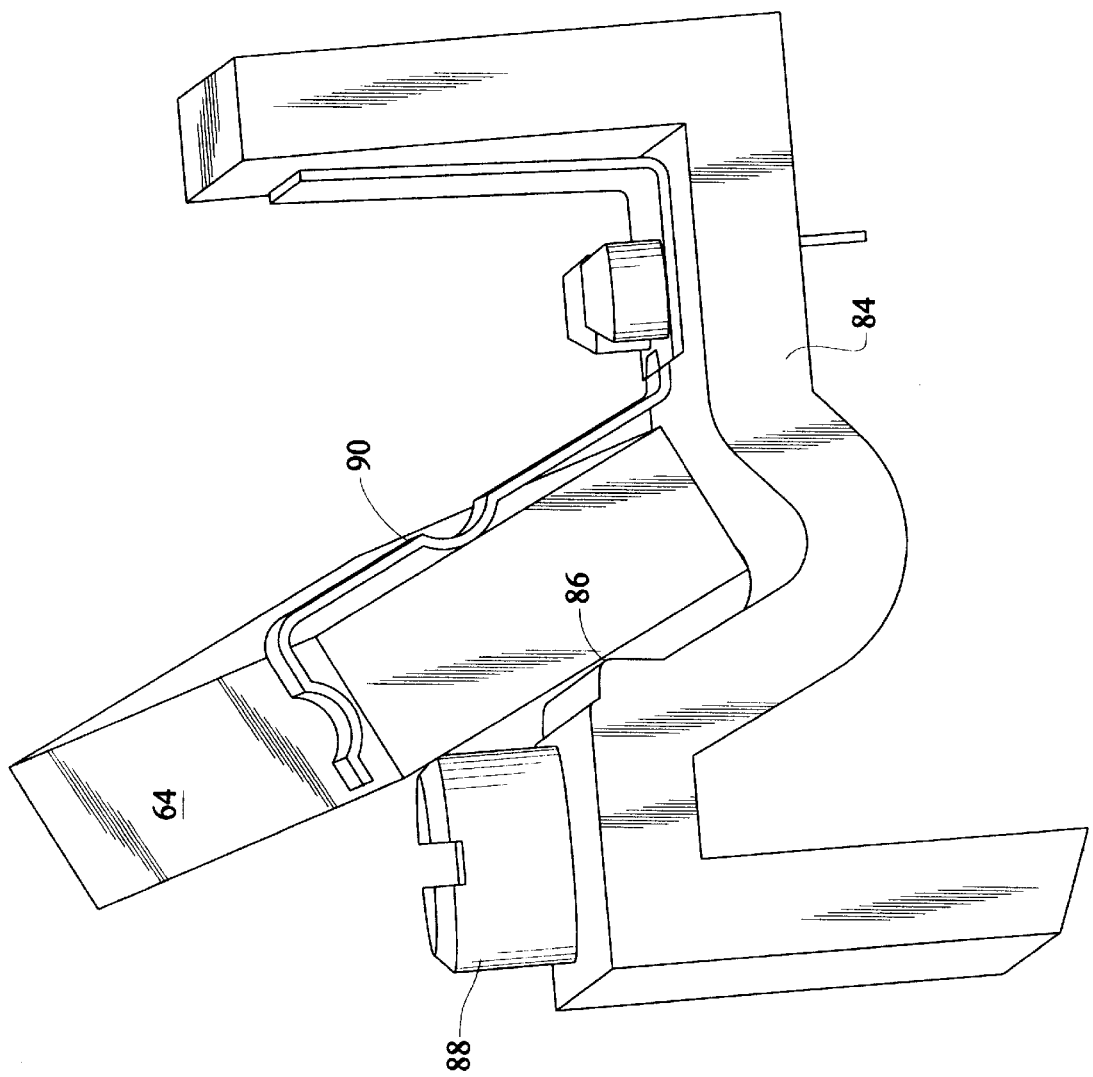

OPTICAL SYSTEM FOR LIGHT BEAM SCANNING

CROSS-REFERENCE TO RELATED APPLICATION

This application is a continuation-in-part of U.S. application Ser. No. 09/086,526, filed on May 29, 1998, abandoned, the complete disclosure of which is incorporated by reference.

BACKGROUND OF THE INVENTION

The present invention relates to an optical system for scanning an object surface with a beam of light originating at a light source, and, more particularly, to such an optical system particularly suited for use in laser printers.

An optical system used in laser printers may be characterized as having three sub-systems, namely, a pre-scan optical sub-system, a scanning sub-system, and a post-scan sub-system. Typically, the pre-scan optical sub-system includes a laser diode with large beam divergence for a light source, a collimator lens to produce a collimated beam of the light emitted by the laser diode, a pre-scan lens to focus the process beam to a waist, a plane pre-scan mirror to fold the pre-scan optics path and to attenuate laser power, and associated mounting hardware.

The scanning sub-system is essentially a motor driven rotatable polygonal reflector having adjacent peripheral mirror surfaces or facets that both translate and rotate in operation of the printer. The mirror surfaces reflect the collimated and focused beam of the pre-scan optical sub-system and their direction of translation determines the scan direction of the beam passing to a scanned object, that is, a photosensitive drum in a laser printer.

The post-scan optical system conventionally includes a focusing lens for transforming the light beam reflected from the polygonal reflector of the scanning sub-system into a beam having spot size suitable for the laser printing operation, and a lens known in the art as an f-theta lens. The f-theta lens functions principally to compensate spot positional dependence on the tangent of the scanning mirror rotation angle θ in order to produce a nearly linear position to angle relationship. The post-scan optical sub-system may also include one or more folding mirrors to adapt to the geometry of the printer apparatus.

The pre-scan optical sub-system defines the light beam axis between the laser diode source and the rotatable polygonal reflector and provides a set of beam diameters and radii of curvature at two locations on that axis. Although the optical components used in this sub-system are relatively uncomplicated from a design standpoint, the pre-scan optical sub-system utilizes very short focal length optics of high numeric aperture for reasons of size and efficiency of coupling to the laser diode. As a result, sensitivity to component tolerance and placement accuracy are very important. Also, the pre-scan optical sub-system is required to produce a beam waist in the cross scan or processing direction, perpendicular to the scan direction, at a precise location relative to the polygonal reflector. This requirement has been satisfied in the prior art by a plano-cylindrical lens oriented with the axis of the cylinder parallel to the scan direction.

The polygonal reflector of the scanning sub-system of laser printers rotates at speeds in the range of tens of thousands of revolutions per minute and, as such, represents a source of audible and optical noise that has a deleterious effect on the ultimate quality of laser printer performance. Therefore, reduction in size and inertia of the rotatable polygonal mirror continues to be a much-sought-after objective of laser printer optical systems. The required width of the polygonal mirror surfaces in the cross scan direction has been reduced significantly by the aforementioned plano-cylindrical pre-scan lens. However, a reduction in the length of the peripheral mirror facets on the polygonal reflector is limited by beam diameter in the scan direction.

In the prior art, various designs of the pre-scan optical sub-system have been advanced to reduce the width of the laser beam directed to the polygonal scan reflector. Beam truncation by selection of the collimator lens represents one approach. The divergent beam emitted by the laser diode is truncated by the collimator lens because the clear aperture of collimator lens is smaller than the numerical aperture of the beam. Since the laser diode is aligned with its plane of widest divergence in the scan plane, the truncation effect is much larger in the scan direction. The main limiting factors in selection of the numeric aperture of a collimator lens, and thus the degree of truncation, are the cost of a collimator lens, allowable wavefront distortion due to a collimator lens, and allowable power loss. A secondary effect of truncation is the appearance of diffracted power as "lobes" associated with spots at the drum surface.

The use of aperture stops for reducing the width of the beam in the pre-scan optical system has also been proposed. This approach is also limited by allowable power loss. Finally, attempts have been made to reduce beam width at the scanning mirror facets, in the scan direction, by defocussing the collimator lens. This approach to the problem, however, results in the creation of spherical aberrations, increased wave front errors, and resulting lower print quality. Also, proper defocussing adjustment of a collimator lens requires extremely high precision, thereby making the proper adjustment very difficult to achieve in practice.

Accordingly, there is a need for improvement in the current optical systems used in devices such as laser printers, particularly a reduction in rotatable scan reflector diameter without compromising cost and print quality considerations.

SUMMARY OF THE INVENTION

The advantages and purpose of the invention will be set forth in part in the description that follows, and in part will be obvious from the description, or may be learned by practice of the invention. The advantages and purpose of the invention will be realized and attained by the elements and combinations particularly pointed out in the appended claims.

To attain the advantages and in accordance with the purpose of the invention, as embodied and broadly described herein, the invention is directed to an optical system for light scanning devices in which a beam of light travels from an origin to an object along a light path and has along that path a scan direction and a cross-scan direction. The optical system includes a light source at the origin of the light path, a polygonal reflector located along the light path and having adjacent peripheral mirror surfaces rotatable in the scan direction, and a pre-scan optical sub-system located along the light path between the light source and the polygonal reflector. The pre-scan optical sub-system includes, in order of light travel from the light source, a collimating lens and a pre-scan lens having a convex cylindrical lens entrance surface aligned in the scan direction for converging the light beam in the cross-scan direction, and a convex lens exit surface for converging the light beam in the scan direction.

An aperture stop may be provided at a convenient location between the collimating lens and the pre-scan lens to further truncate or reduce the diameter of the collimated beam.

In another aspect, the advantages and purpose of the invention are attained by an optical system of the type described including a post-scan optical sub-system located along the light path between the rotatable polygonal reflector and the object. The post-scan optical sub-system includes a first f-theta lens that alters the light beam to provide high convergence of the reflected light beam in the scan direction and low divergence or convergence in the cross-scan direction, and a second f-theta lens that alters the light beam sto provide slightly higher convergence in the scan direction, and high convergence in the cross scan direction.

In yet another aspect, the advantages and purpose of the invention are attained by a lens for directing a collimated light beam to a scanning reflector having adjacent peripheral mirror surfaces rotatable in a scan direction. The lens includes a lens body, a convex cylindrical entrance surface shaped to converge the collimated light beam in a cross-scan direction perpendicular to the scan direction, and a convex exit surface shaped to converge the collimated light beam in the scan direction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

FIG. 2 is a perspective view illustrating a preferred orientation of the optical components shown in FIG. 1;

FIGS. 6A and 6B are schematic views depicting beam optics of a pre-scan optical sub-system in cross-scan and scan directions, respectively;

FIGS. 7A and 7B are schematic views depicting beam optics of a post-scan optical sub-system in cross-scan and scan directions, respectively;

FIG. 8 is a fragmentary perspective view of a beam detect sensor;

FIG. 10 is a fragmentary perspective view of a folding mirror mounting arrangement.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, an optical system is provided for light scanning devices in which a beam of light travels from an origin to an object along a light path and has along that path a scan direction and a cross-scan direction. A light source is located at the origin of the light path and a polygonal reflector, having adjacent peripheral mirror surfaces rotatable in the scan direction, is located along the light path. A pre-scan optical sub-system is provided between the light sources and the polygonal reflector and a post-scan optical sub-system is between the polygonal reflector and the object.

Figure 1:
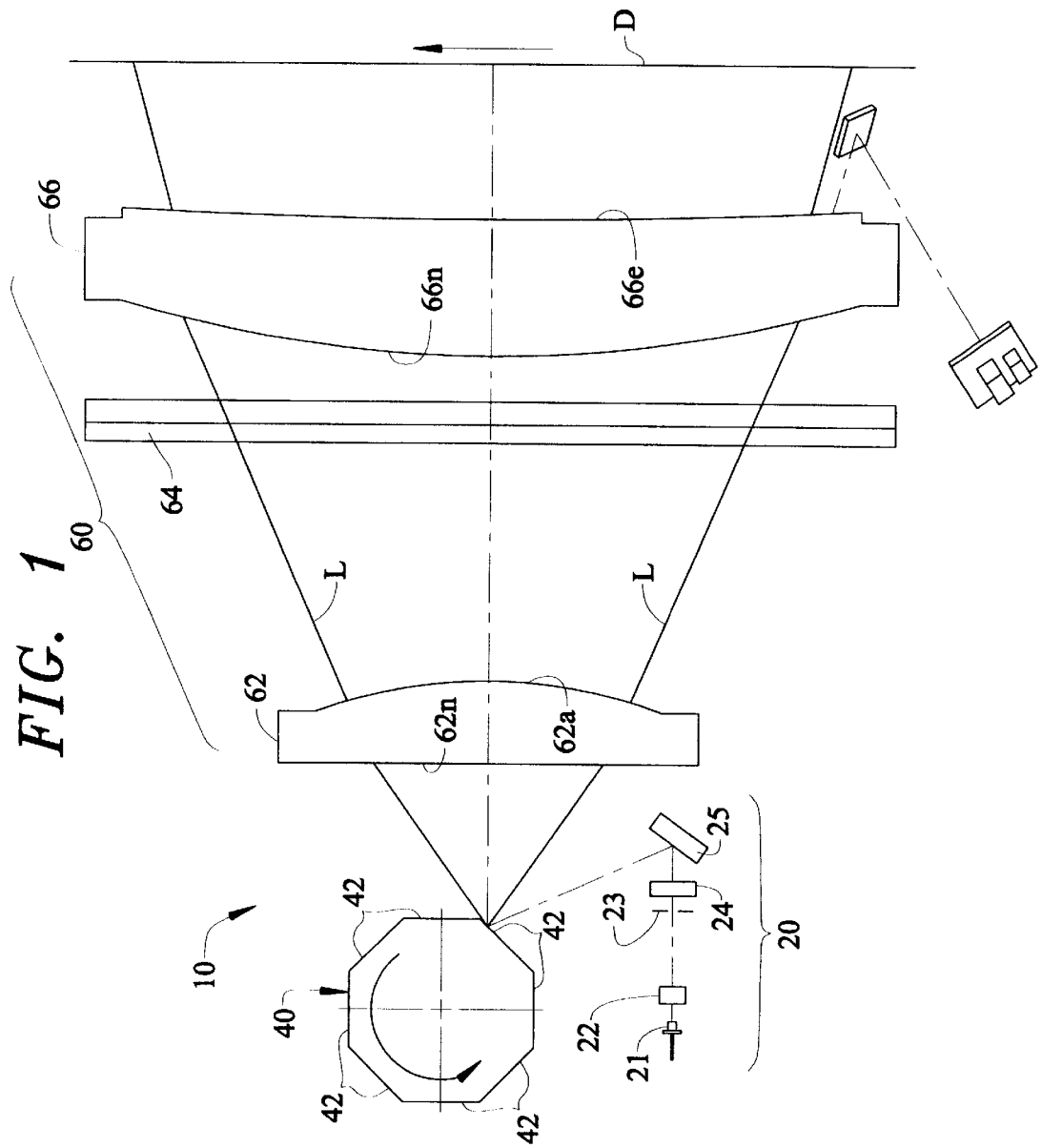
FIG. 1 is schematic view depicting an optical system incorporating the principles of the present invention with components aligned in a single plane.

In the illustrated embodiment, as shown schematically in FIGS. 1 and 2, an optical system generally designated by the reference numeral 10, is shown to include a pre-scan optical sub-system 20, a rotatable polygonal reflector 40 and a post-scan optical sub-system 60. In FIG. 1, the several components of optical system 10 are depicted schematically as aligned in the plane of the paper. The perspective illustration in FIG. 2 is more representative of optical component orientation in practice. In both FIGS. 1 and 2, a light beam L originates at a source to be described, and is transmitted through the respective optical sub-systems to scan an object, such as a photosensitive drum surface represented by a line D.

As shown, polygonal reflector 40 is peripherally octagonal, thus presenting eight adjacent mirror surfaces or facets 42. It is driven in rotation by a motor (not shown), in the scan direction, which, in the illustrated embodiment is counterclockwise as depicted by the arrow 44.

Figure 5:
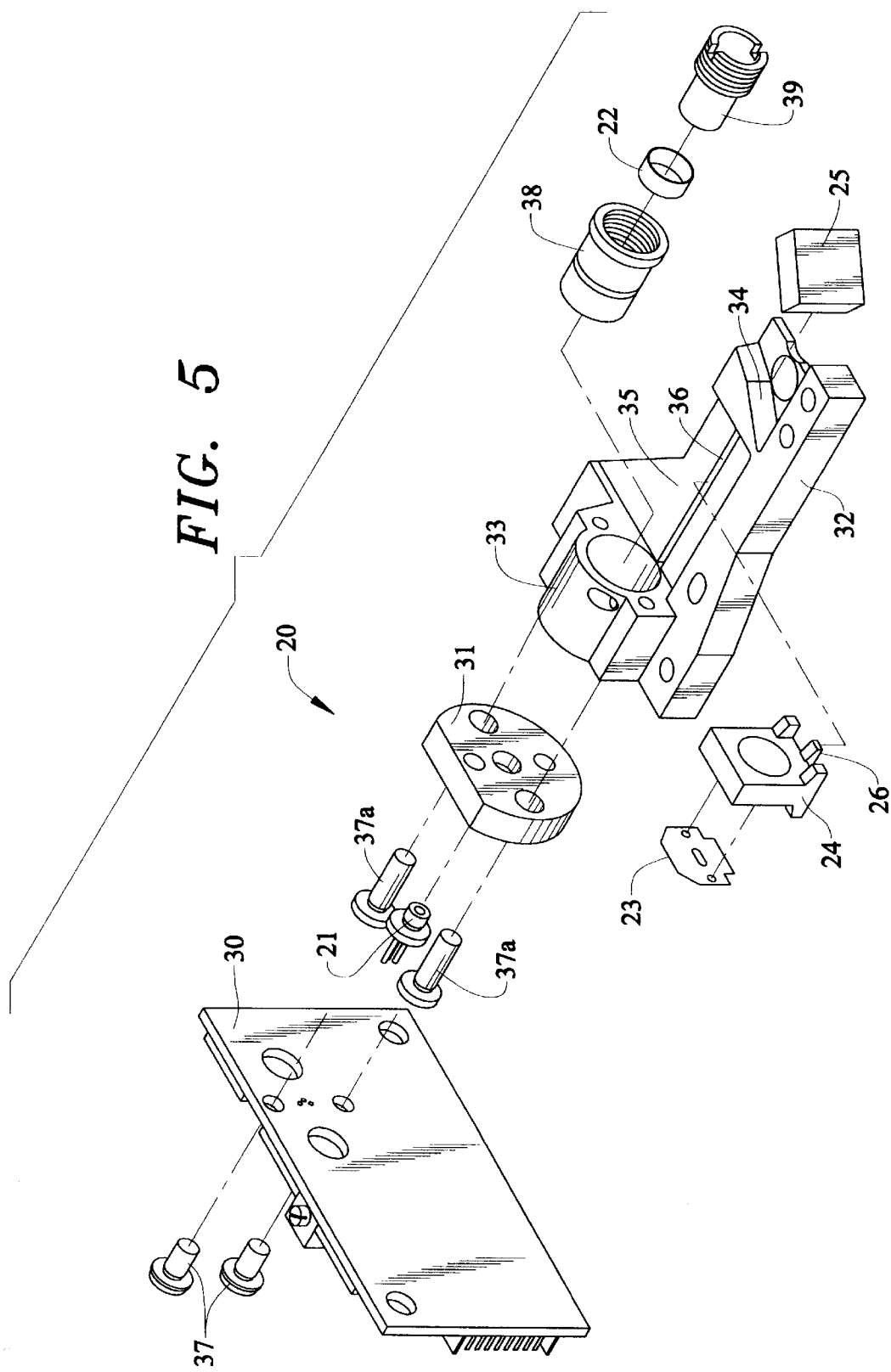
FIG. 5 is an exploded perspective view showing mounting components for an optical pre-scan sub-system.

Pre-scan optical sub-system 20 is shown in FIGS. 1, 2 and 5 to include a laser diode 21 with large beam divergence for a light source, a glass aspheric collimator lens 22 to produce a collimated beam, an aperture stop 23 to control beam size and reduce diffraction lobes, a pre-scan lens 24 to focus the beam to a waist in a cross-scan direction, and a plane pre-scan mirror 25 to fold the pre-scan optics path and to attenuate laser power. In alternative embodiments, mirror 25 may be unnecessary by appropriate realignment of pre-scan optical sub-system from that shown.

Laser diode 21 may be, for example, a commercially available light source such Sanyo DL-3144 or Rohm-RLD 78NP having a wavelength of about 780 nm and nominal output power of 3.0 mW. The beam divergence at full-width/ half-maximum (FWHM) is typically 20 to 30 degrees in the scan direction and 7 to 12 degrees in the cross-scan or process direction when oriented so that the junction is parallel to the cross-scan direction. Similar laser diodes are available from several vendors.

Collimator lens 22 also may be a commercially available lens supplied by Hoya, for example. Preferably, lens 22 is a molded glass bi-asphere with focal length of 8.0 mm and a numeric aperture of 0.30. Lens 22 may be mass produced by compression molding of optical glass on precision aspherical molds. Collimator lens 22 produces best collimation with the facet of laser diode 21 placed at the lens focal point. Glass is preferably chosen over plastic application because the index of refraction of plastic changes excessively with temperature and could create large changes in beam spot size and beam waist location.

Aperture stop 23 serves to control variability of beam diameter and hence spot size by truncating the beam for divergence angles of the laser diode which exceed the minimum specified value. Aperture stop 23 preferably has an elliptical aperture shape, which is also the inherent shape of the diode laser beam, to reduce the diffraction effects of a truncated beam. That is, the diffracted power is spread over a large area around a far field spot which reduces the power density of the lobes when compared to a rectangular aperture. The result is better print quality of fine patterns.

In accordance with the present invention, pre-scan lens 24 has a convex cylindrical lens entrance surface aligned in the scan direction for converging the light beam in the cross-scan direction, and a convex lens exit surface for converging the light beam in the scan direction.

Figure 3B:
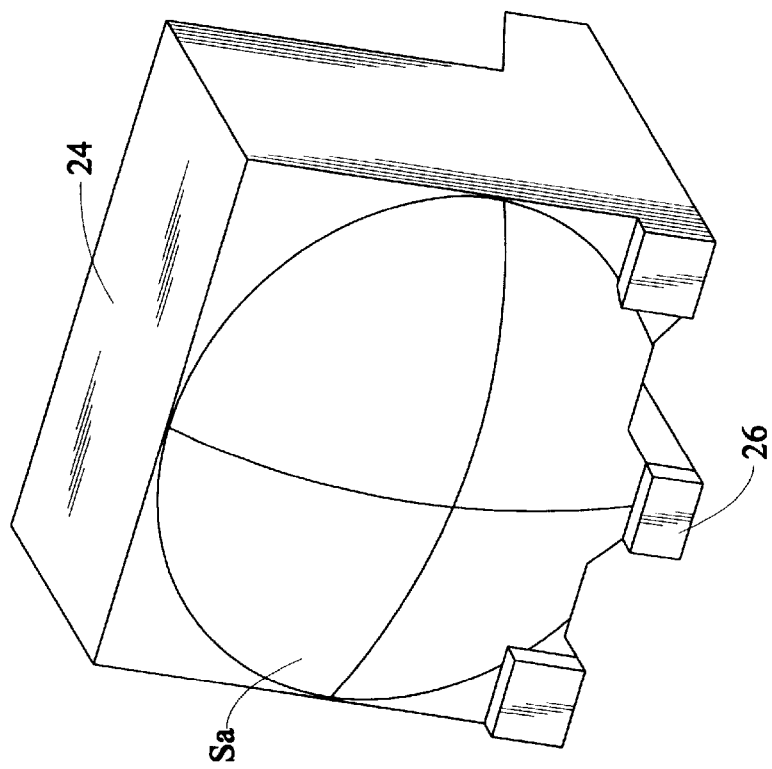
FIGS. 3A and 3B are perspective views showing beam entrance and beam exit sides, respectively, of a preferred pre-scan lens.
Figure 3A:
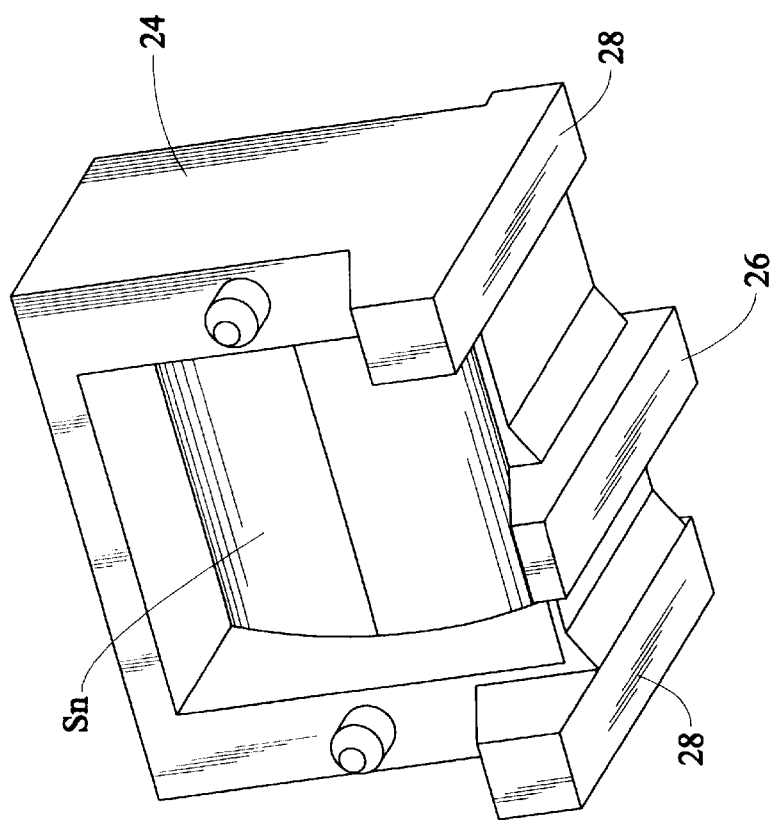

In the illustrated embodiment, as shown most clearly in FIGS. 3A,3B, pre-scan lens 24 is a monolithic, generally rectangular, molded plastic body, preferably polycarbonate, having reference mounting formations including a central guide rail 26 and a pair of laterally disposed positioning slides 28.

FIGS. 3A and 3B show opposite beam entrance and beam exit faces, respectively, of a presently preferred embodiment of pre-scan lens 24. As such, pre-scan lens 24 is formed with a convex cylindrical lens entrance surface Sn having its cylindrical axis aligned in the scan direction, as shown in FIG. 3A, and a convex, preferably spherical lens exit surface Se, as shown in FIG. 3B.

Cylindrical lens entrance surface Sn focuses the beam to a waist in the cross-scan direction and has a focal length of approximately 68 mm, and, in itself, is known in the prior art. Spherical lens exit surface Se, with a focal length on the order of 1300 mm, much greater than the cylindrical focal length, sets the phase radius of curvature for the scan direction to produce a converging beam. With this anamorphic design of pre-scan lens 24, collimator lens 22 does not need to be defocused to produce the converging scan direction beam. Focusing collimator lens 22 for collimation much easier to accomplish than focusing to achieve a converging beam.

Also, use of the pre-scan lens for setting the beam phase radius eliminates the problem of iteration for a beam convergence as $M^2$ of laser diode 21 changes from diode to diode. See A. E. Siegman, "New Developments in Laser Resonators", SPIE Vol. 1224 Optical Resonators, 1990, incorporated herein by reference.

Also, tolerances in the molding of pre-scan lens 24 may be kept sufficiently tight that adjustments in the scan direction, cross-scan direction and rotation about the optical axis are eliminated. Only a translation of the lens along the optical axis is needed in order to set the cross-scan waist at the object point of post-scan optical system 60.

Figure 4B:
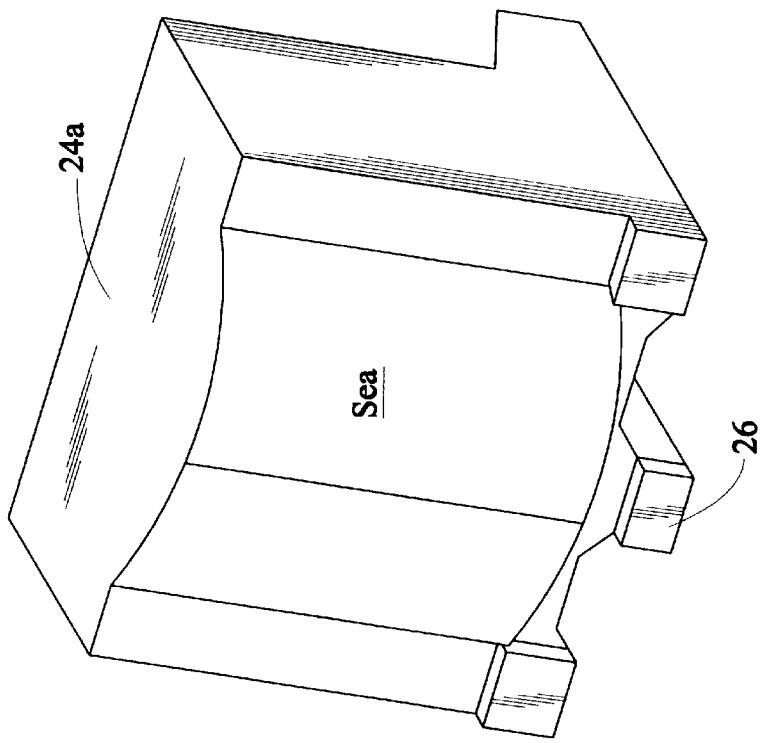
FIGS. 4A and 4B are perspective views showing beam entrance and beam exit sides, respectively, of an alternative pre-scan lens.
Figure 4A:
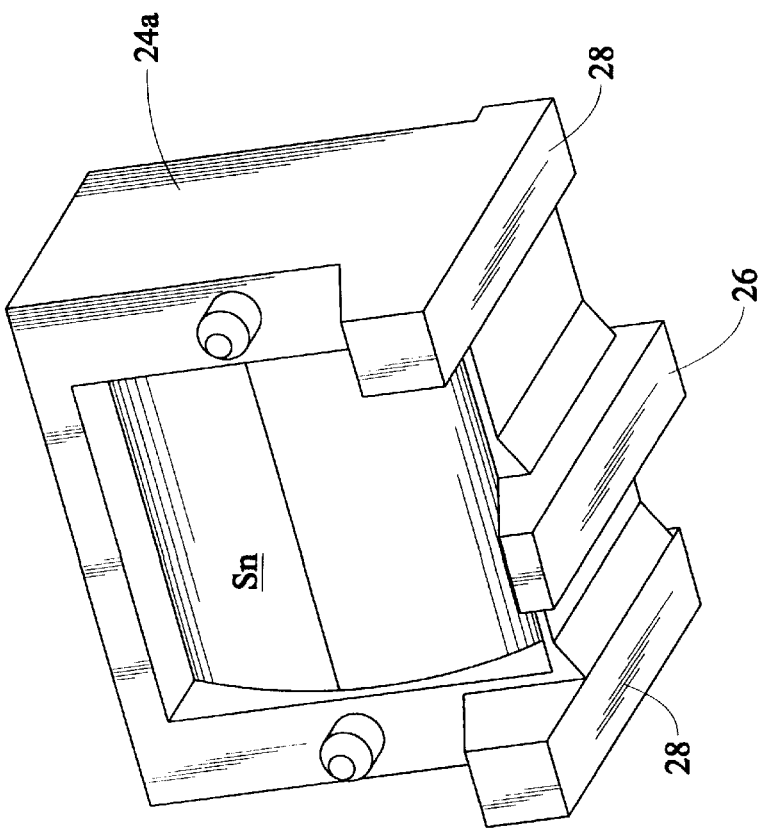

An alternative embodiment of a pre-scan lens 24a is shown in FIGS. 4A and 4B, in which reference characters designating parts identical to those identified in FIGS. 3A and 3B remain the same, whereas parts differing in structure but similar in function are designated by the same reference characters with an "a" suffix.

In the alternative embodiment, the entrance face of lens 24a, shown in FIG. 4A is the same as that shown in FIG. 3A and is formed with the same convex cylindrical lens entrance surface Sn. However, the convex spherical lens exit surface Se in FIG. 3A is replaced by a convex cylindrical lens exit surface Sea. Cylindrical lens exit surface Sea is orthogonal to cylindrical lens entrance surface Sn and thus has its axis aligned with the cross-scan direction. In all other respects, such as surface radius, the alternative lens exit surface Sea in FIG. 4A is the same as the lens exit surface Se in FIG. 3A.

Pre-scan mirror 25 is a plane mirror in pre-scan optical sub-system that serves to fold the optical path for a more compact package. Mirror 25 may also serve to attenuate the nominal laser power to provide 0.375 mW at the image plane. This is accomplished by choosing a mirror coating with the proper reflectance. For example, a chromium mirror will reflect 60% of the incident laser power.

The assembly and alignment of components in pre-scan optical sub-system 20 may be understood by reference to FIG. 5 of the drawings. In FIG. 5, mounting hardware for pre-scan optical sub-system 20 is shown to include a laser driver board 30, a diode plate 31, and a collimator housing 32. The laser diode input current is supplied by laser driver board 30. Collimator housing 32 is formed with a collimator lens mount 33, a pre-scan mirror mount 34, and a planar top guide surface 35 having a linear guide groove 36.

The assembly/adjustment procedure for the pre-scan optical sub-system 20 shown in FIG. 5 is initiated by attaching laser diode 21 to diode plate 31 with UV cured adhesive. Diode plate 31 is attached to laser driver board 30 with screws 37 using proper torque. Laser diode 21 is then hand soldered to driver board 30 with "no wash" solder.

Collimator lens 22 is attached to a lens shell 38, using a threaded bezel 39, and secured in lens shell 38 with UV cured adhesive.

The card assembly of laser driver board 30, laser diode 21 and laser diode plate 31 is then attached to collimator housing 32 with screws 37a. Laser diode 21 is pointed by moving laser driver board 30 in cross-scan and scan directions.

Laser diode 21 is then collimated by moving collimator lens shell 38 along the optical axis in collimator lens mount 33. Lens shell 38 is then attached to collimator lens mount 33 with UV cured adhesive.

Elliptical aperture stop 23 is attached to pre-scan lens 24 with either adhesive or a hot-upset operation and pre-scan mirror 25 is attached to mount 34 of collimator housing 32 with UV cured adhesive.

Pre-scan lens 24 is then inserted on planar guide surface 35 with central guide rail 26 thereof in guide groove 36 of collimator housing 32 and adjusted along the optical axis for proper process or cross-scan waist location. Pre-scan lens 24 is then attached to collimator housing 32 with UV cured adhesive.

From the foregoing, it will be appreciated that assembly and adjustment of pre-scan optical sub-system 20 is a very critical procedure. A few microns of movement of laser diode 21 relative to collimator lens 22 will adversely affect spot size/shape at the surface of an object drum to be scanned. Rotation of the pre-scan lens about the optical axis will result in unacceptable spot size/shape. Flatness of pre-scan mirror 25 is important to prevent astigmatism. Tilt or decenter of collimator lens 22 will cause the laser pointing adjustment to introduce coma, which causes asymmetrical diffraction lobes.

The effect of pre-scan optical sub-assembly on the light beam L may be understood by reference to FIGS. 6A and 6B, which depict light beam L in cross-scan and scan directions, respectively. Thus, in FIG. 6A, light beam L emitted by laser diode 21 is collimated by collimator lens 22, truncated by aperture stop 23, and converged primarily by convex cylindrical entrance surface Sn on pre-scan lens 24 to a waist of minimum width at a point P located slightly in advance of mirror facets 42 on rotatable polygon reflector 40. Viewed in the scan direction, or perpendicular to the cross-scan beam of FIG. 6A, and as shown in FIG. 6B, the collimated beam exiting collimating lens 22 is less truncated than in the cross-scan direction, due to increased length on the major axis of elliptical aperture stop 23 over that on the minor axis, and also converged to a lesser degree by exit surface Se of pre-scan lens 24. As a result, the spot or line cross-section of beam L reflected by mirror facets 42 is reduced in length and permits a smaller diameter of rotatable scanning reflector 40.

In accordance with the invention, post-scan optical sub-system 60 includes a first f-theta lens that alters the light beam L to provide high convergence in the scan direction and low divergence or convergence in the cross-scan direction, and a second f-theta lens that alters the light beam to provide slightly higher convergence in the scan direction, and high convergence in the cross scan direction.

An understanding of the illustrated embodiment of post-scan optical sub-system 60 may be gained by reference to FIGS. 1, 2, 7A and 7B. As shown in these figures, post-scan optical sub-system 60 includes a first f-theta lens 62, a folding mirror 64, and a second f-theta lens 66. The function of f-theta lenses 62 and 66 is to jointly minimize errors in spot positional dependence on scanning mirror rotation angle, spot size at the exposed surface, and focal waist distance from the exposed surface according to criteria imposed by printed image quality considerations. Folding mirror 64 functions only to render post-scan optical sub-system 60 more compact and has a minimal effect on light beam L other than to change its direction.

Each of first and second f-theta lenses 62 and 66 has an entrance lens surface 62n, 66n and an exit lens surface 62e and 66e, respectively. Entrance lens surface 62n is toroidal or quasi-toroidal with a large concave scan direction radius and a relatively small concave cross scan radius.

A "quasi-toroidal" surface is similar to a true toroidal surface, but the cross-scan radius is cut in a plane defined by the surface optical axis rather than in a plane defined by principal radii of the surface. A quasi-toroidal surface simplifies lens manufacture and, for that reason is preferred. The term "generally toroidal," as used herein and in the appended claims, is intended as generic to both toroidal and quasi-toroidal lens surfaces.

Entrance lens surface 62n acts, in the scan direction, mostly to redirect the beam axis toward the system axis during rotation of polygonal reflector 40. This surface provides a significant amount of the f-theta compensation for the system. Lens surface 62n also decreases the convergence of the beam in the scan direction and increases divergence in the cross scan direction.

Exit lens surface 62e of first f-theta lens 62 is a generally toroidal surface with significantly smaller radii of curvature than entrance lens surface 62n. At this surface, the scan direction wavefront convergence becomes high and the cross scan divergence or convergence becomes low. There is little additional f-theta correction at the lens surface 62n.

Entrance lens surface 66n of second f-theta lens 66 is a generally toroidal surface with moderate positive optical power in the scan direction and moderate negative power in the cross scan direction. The effect on beam L is a significant f-theta correction, a slightly increased scan direction convergence, and a large beam divergence in the cross scan direction.

Exit lens surface 66e on second f-theta lens 66 is generally toroidal with low negative optical power in the scan direction and high positive power in the cross scan direction. The beam radii presented by prior surfaces are modified to produce a waist in both directions at or near drum surface D. Exit lens surface 66e provides a small negative f-theta effect, sufficient to compensate for over-correction at entrance surface 66n.

Both f-theta lenses 62 and 66 are relatively thick, about 20 and 30 millimeters, respectively. For for thick lenses, principal plane location and separation significantly affect focal properties. In a laser printer, system aperture is beam aperture and each beam location encounters essentially a different lens system. The degree of principal plane movement with focal length is proportional to lens thickness, so small changes in focal power along a path have greater effect in thick lenses than in thin. Also, since the polymer used to make the lenses of present invention has a high temperature coefficient of refractive index change, it is possible to partially compensate the thermal effects on system focal properties by utilizing principal plane movement due to index changes. Thicker lenses allow better compensation.

Although the effects of post-scan optical sub-system surfaces have been described as if they were independent, in reality, lens and surface interactions are adjusted with the wavefront set to meet an overall performance criterion. Also, component parameters have been described generally by relation and function primarily because of the behavior of a substantially coherent light beam developed by a laser diode. In particular, a substantially coherent or Gaussion light beam propagates between points of true or almost true collimation. At the points of collimation, the light beam reaches a minimum diameter or "waist," the diameter size being dependent on wavelength of the light beam. As the beam approaches a waist, it converges. As the beam passes a waist, it diverges. These characteristics presume propagation of the substantially coherent light beam in a medium of constant density.

The position of a waist and the rate of convergence and divergence to and from that waist in the substantially coherent light beam is altered by the described lenses, and primarily by the entrance and exit surfaces of those lenses. Also, the rate of convergence or divergence can be quantified, for a give wavelength, on the basis of the diameter size of the waist to or from which the beam converges or diverges, assuming no further alteration of the light beam during a particular convergence or divergence. Although diameter implies a circular shape, as used herein, diameter means beam width in the scan and cross-scan directions, respectively. Thus, in the preceding description and in the appended claims, where convergence or divergence at the lens surfaces is referred to as "low," "moderate," or "high," or synonyms of those relative terms, a beam waist diameter size $w_o$ in the respective scan and cross-scan directions for a wavelength of 780 nm, assuming no further alterations, would occur as follows:

low convergence/divergence → $w_o \geq 0.5$ mm moderate convergence/divergence → $0.1$ mm $< w_o < 0.5$ mm, and high convergence/divergence → $w_o \leq 0.1$ mm.

An example of system component dimensions and parameter that has proven highly effective in a laser printer is given below. However, it will be understood that specific parameters given in the example will vary with the application in which the optical system of the invention is used.

EXAMPLE

Laser Print Head Optical Components
Laser Diode power=5 mw, wavelength=780 nm, off-shelf part such as Sanyo DL-3144 or Rohm RLD-78NP, oriented such that junction is parallel to cross-scan direction.

Collimator Lens
    molded glass asphere such as Hoya A63 with 8 mm focal length, center thickness=4.0 mm
Laser Diode to Collimator Lens distance
    diode facet to 1st surface of collimator lens=5.82 mm (adjusted for best collimation).
Aperture Stop
    elliptical shape, major axis (scan)=3.70 mm, minor axis (cross-scan)=1.55 mm, thickness=0.254 mm Collimator Lens to Aperture Stop distance=23.8 mm
Pre-scan Lens
    polycarbonate, index=1.573456 @ 780 mm, center thickness=3.55 mm Entrance surface (cylindrical cross-scan radius)=42.5 mm (convex) Scan radius=∞ Exit surface (spherical) Cross-scan radius=731 mm (convex) Scan radius=731 mm (convex) Aperture Stop to Pre-scan lens distance=0 mm (mounted on pre-scan lens).
Pre-scan Mirror
    fold mirror, plane Pre-scan Lens to Pre-scan Mirror distance=14.5 mm
Polygonal Reflector
    8 facet rotating polygon, 50 mm diameter (tip to tip) Pre-scan Mirror to Polygonal Reflector distance=55.2 mm, varies as Polygonal Reflector rotates
First f-theta Lens
    polystyrene, index 1.578627 @ 780 nm, center thickness=20.576 mm Entrance surface (toroidal) AR coated cross-scan radius=115.6 mm (concave) scan radius=1064.4 mm (concave) Exit surface (toroidal) cross-scan radius=28.72 mm (convex) scan radius=123.5 mm (convex) Polygonal Reflector to First f-theta Lens distance=38.6 mm (varies as polygon rotates)
Folding Mirror
    plane First f-theta Lens to folding mirror distance=59.98 mm
Second f-theta Lens
    polystyrene, index=1.578627 @ 780 nm, center thickness=29.458 mm Entrance surface (toroidal) cross-scan radius=37.838 mm (concave) scan radius=344.1 mm (convex) Exit surface (toroidal) AR coated cross-scan radius=24.099 mm (convex) scan radius=1004.7 (concave) Folding Mirror to Second f-theta Lens distance=18.0 mm Second f-theta Lens to Drum Surface=85.02 mm.

Drum exposure can occur due to extraneous beam paths involving multiple reflections from the surfaces of optical elements. In the present invention, some such paths involve reflection from a lens surface and a second reflection from a facet of the scanning mirror. Because of the high reflectance of mirror facets 42, these reflected paths have high potential for unwanted drum exposure. The angle which the beam from pre-scan optical sub-system 20 makes with the optical axis of post-scan optical sub-system 60 is determined by the need to separate such secondary reflected paths from the paths of the principal beam so that the secondary reflected paths can be blocked by mechanical obstacles. Analysis of secondary paths involving two reflections from lens surfaces shows that some paths have the potential for significant drum exposure due to very low velocity of the secondary spots during portions of the scan. The transmission along these secondary paths is reduced considerably in the present invention by anti-reflection coatings on the f-theta lens surfaces 62n and 66e.

To synchronize electronic data generated by electronics, with the asynchronous mechanical raster scans of a laser printhead, a beam detection and horizontal synchronization mechanism, generally designated by the reference number 70 in FIG. 2, is provided in optical system 10. It is also used to minimize the effects of slight imperfections in the rotatable polygonal scanning mirror, by providing a consistent start of scan regardless of slight angular flaws in adjacent scanning mirror facets.

In the illustrated embodiment, as shown most clearly in FIG. 8, a beam detect mirror 72 is located to intercept beam rays after the exit surface 66e of f-theta lens 66. So located, beam detect mirror 72 is oriented to reflect beam detect rays from the lower elevation of the second f-theta lens exit surface 66e, to a beam detect sensor 74.

When beam detect sensor 74 is placed at the appropriate optical distance from exit surface 66e of second f-theta lens 66. scanning beam L, that scans across beam detect sensor 74, is traveling at the same velocity as the scanning beam on drum surface D. Also, positioning beam detect sensor 74 at the same optical distance away from exit surface 66e as drum surface D, the beam which streaks across beam detect sensor 74 will have the same small spot size as the scanning beam on the writing surface D.

Beam detect sensor 74 is mounted on an adjustably positioned beam detect board 76 that may be adjusted in either direction along the scan line to intercept light from mirror 72 when beam L is at a predefined location on drum surface D for a first writing position. Once the proper location of beam detect board 76 is set, it is locked into place with a locking adjustment screw (not shown).

Beam detect sensor 74 is preferably a commercially available high aspect ratio sensor which is 0.5 mm wide and 3.0 mm tall. The 0.5 wide dimension keeps the surface area of the sensor small, and the response time of the sensor fast. The 3.0 mm tall sensor is large enough so that even slight movements of the scan in the cross-scan direction resulting from thermal expansion of the various components will not cause the laser scan to miss the beam detect sensor.

Figure 9:
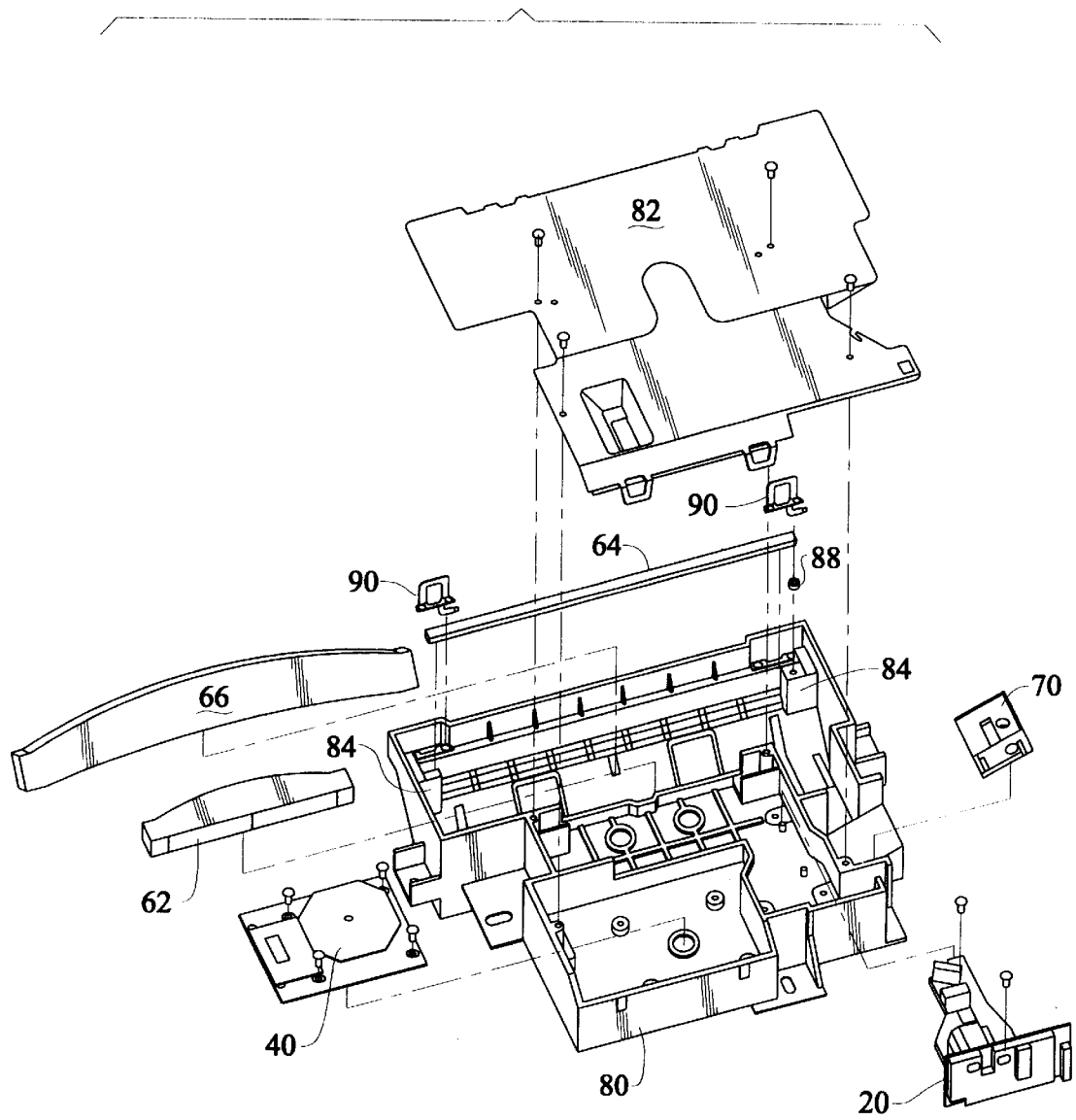
FIG. 9 is an exploded perspective view depicting assembly of an optical system.

Optical system 10 is supported in the general orientation shown in FIG. 3 by a system housing 80 having a cover 82, and shown in FIG. 9 with components of optical system 10 in exploded perspective relation. With the exception of folding mirror 64, assembly of the several optical components into system housing 80 is believed clear from the illustration of FIG. 9 and will not be explained further.

Folding mirror 64 is supported at opposite ends in housing 80 by bearing formations 84. As shown in enlarged scale in FIG. 10, the front surface of fold-down mirror 64 is mounted against three points of support on bearing formations 84, that is, a pair of pivot points 86, one on each of bearing formation 84 at opposite ends of folding mirror 64, and a cam like eccentric nut 88. Pivot points 86 correspond to the exact center of the optical system elevation in the cross-scan direction.

Folding mirror 64 is held against the two pivot points 86 at each end of the mirror by two identical mirror clips 90, which, when snapped into system housing 80, apply pressure on the mirror slightly about above pivot points 86 to bias folding mirror 64 onto the contact surface of eccentric nut 88. Thus, by rotating eccentric nut 88 by an external screw driver, folding mirror 64 is adjustably pivoted about the two pivot points 86. The purpose of this adjustment is to ensure that scanning beam L, that is exiting from the optical center of first f-theta lens 62 in the cross-scan direction, is properly aligned so that it enters the optical center of second f-theta lens 66 in the cross-scan direction after it has been reflected from folding mirror 64. The adjustment is not used to provide correction of any optical component misalignments, rather its purpose is to ensure that folding mirror 64 properly places the reflected beam L on the optical center-line of second f-theta lens 66 in the cross-scan direction.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical system for light scanning devices in which a beam of light travels from an origin to an object along a light path and has along that path a scan direction and a cross-scan direction, comprising:
   a light source at the origin of the light path;
   a polygonal reflector located along the light path and having adjacent peripheral mirror surfaces rotatable in the scan direction;
   a pre-scan optical sub-system located along the light path between said light source and said polygonal reflector and including, in order of light travel from the light source, a collimating lens, and a pre-scan lens having a convex cylindrical lens entrance surface aligned in the scan direction for converging the light beam in the cross-scan direction, and a convex lens exit surface for converging the light beam in the scan direction; and
   a post-scan optical sub-system comprising:
   a first f-theta lens that alters the light beam to provide high convergence in the scan direction and low convergence or divergence in the cross-scan direction; and
   a second f-theta lens that alters the light beam to provide slightly higher convergence than that of said first f-theta lens in the scan direction and high convergence in the cross scan direction.

2. The optical system of claim 1, wherein the first f-theta lens has a generally toroidal entrance lens surface having a large concave scan direction radius and a relatively small concave cross-scan radius, and a generally toroidal exit lens surface with convex radii of curvature smaller than those of the generally toroidal entrance lens surface, and wherein the second f-theta lens has a generally toroidal entrance lens surface having a moderate positive optical power in the scan direction and moderate negative power in the cross-scan direction, and a generally toroidal exit lens surface at which scan direction convergence is moderately increased and cross-scan convergence is greatly increased.

3. The optical system of claim 1, wherein the first f-theta lens has a first concave toroidal lens surface facing the polygonal reflector and having a large concave scan direction radius and a relatively moderate concave cross-scan radius, and a second opposite toroidal convex lens surface with a smaller radii of curvature than the first toroidal lens surface, and wherein the second f-theta lens has a first toroidal lens surface having a large convex radius in the scan direction and a relatively small concave radius in the cross-scan direction.

4. The optical system of claim 1, wherein the first and second f-theta lenses are plastic lenses.

5. The optical system of claim 4, wherein the first and second f-theta lenses have a center thickness of at least 20 mm.

6. The optical system of claim 4, wherein the first f-theta lens has a center thickness of about 20 mm and the second f-theta lens has a center thickness of about 30 mm.

7. An optical system for light scanning devices in which a beam of light travels from an origin to an object along a light path and has along that path a scan direction and a cross-scan direction, comprising:
   a light source at the origin of the light path;
   a polygonal reflector located along the light path and having adjacent peripheral mirror surfaces rotatable in the scan direction to provide a reflected light beam; and
   a post-scan optical sub-system between the polygonal reflector and the object, comprising;
   a first f-theta lens that alters the light beam to provide high convergence in the scan direction and low convergence or divergence in the cross-scan direction; and
   a second f-theta lens that alters the light beam to provide slightly higher convergence than that of said first f-theta lens in the scan direction, and high convergence in the cross scan direction; wherein the first f-theta lens has a first concave generally toroidal lens surface facing the polygonal reflector and having a large concave scan direction radius and a relatively moderate concave cross-scan radius, and a second opposite generally toroidal convex lens surface with a smaller radii of curvature than the first toroidal lens surface, and wherein the second f-theta lens has a first generally toroidal lens surface having a large convex radius in the scan direction and a relatively small concave radius in the cross-scan direction.

8. An optical system for light scanning devices in which a beam of light travels from an origin to an object along a light path and has along that path a scan direction and a cross-scan direction, comprising:
   a light source at the origin of the light path;
   a polygonal reflector located along the light path and having adjacent peripheral mirror surfaces rotatable in the scan direction to provide a reflected light beam; and
   a post-scan optical sub-system between the polygonal reflector and the object, comprising:
   a first f-theta lens that alters the light beam to provide high convergence in the scan direction and low convergence or divergence in the cross-scan direction; and
   a second f-theta lens that alters the light beam to provide slightly higher convergence than that of said first f-theta lens in the scan direction, and high convergence in the cross scan direction; wherein the first f-theta lens has a generally toroidal entrance lens surface having a large concave scan direction radius and a relatively small concave cross-scan radius, and a generally toroidal exit lens surface with convex radii of curvature smaller than those of the generally toroidal entrance lens surface, and wherein the second f-theta lens has a generally toroidal entrance lens surface having a moderate positive optical power in the scan direction and moderate negative power in the cross-scan direction, and a generally toroidal exit lens surface at which scan direction convergence is moderately increased and cross-scan convergence is greatly increased.

9. The optical system of either of claims 7 or 8, wherein the generally toroidal lens surfaces are quasi-toroidal.

* * * * *